United States Patent [19]
Caruolo et al.

[11] 3,919,663
[45] Nov. 11, 1975

[54] METHOD AND APPARATUS FOR ALIGNING LASER REFLECTIVE SURFACES

[75] Inventors: Antonio B. Caruolo, Vernon; Jack W. Davis, East Hartford; Allen P. Walch, Manchester, all of Conn.

[73] Assignee: United Technologies Corporation, Hartford, Conn.

[22] Filed: May 23, 1974

[21] Appl. No.: 472,932

[52] U.S. Cl. .............................. 331/94.5 C; 356/138
[51] Int. Cl.² .......................................... H01S 3/086
[58] Field of Search ........... 331/94.5; 356/138, 140, 356/153, 172

[56] References Cited
UNITED STATES PATENTS
3,579,140   5/1971   Anderson et al. .................. 356/172
3,851,974   12/1974  Ravussin et al. .................... 356/153

*Primary Examiner*—William L. Sikes
*Attorney, Agent, or Firm*—Robert C. Walker

[57] ABSTRACT

Methods and apparatus used in the alignment of high power laser systems to obtain optimum performance are disclosed. An external source of visible radiation provides an alignment beam which is reflected along the axis of a resonator. Reflecting surfaces of the resonator are aligned with respect to the axis located by the visible beam.

17 Claims, 1 Drawing Figure

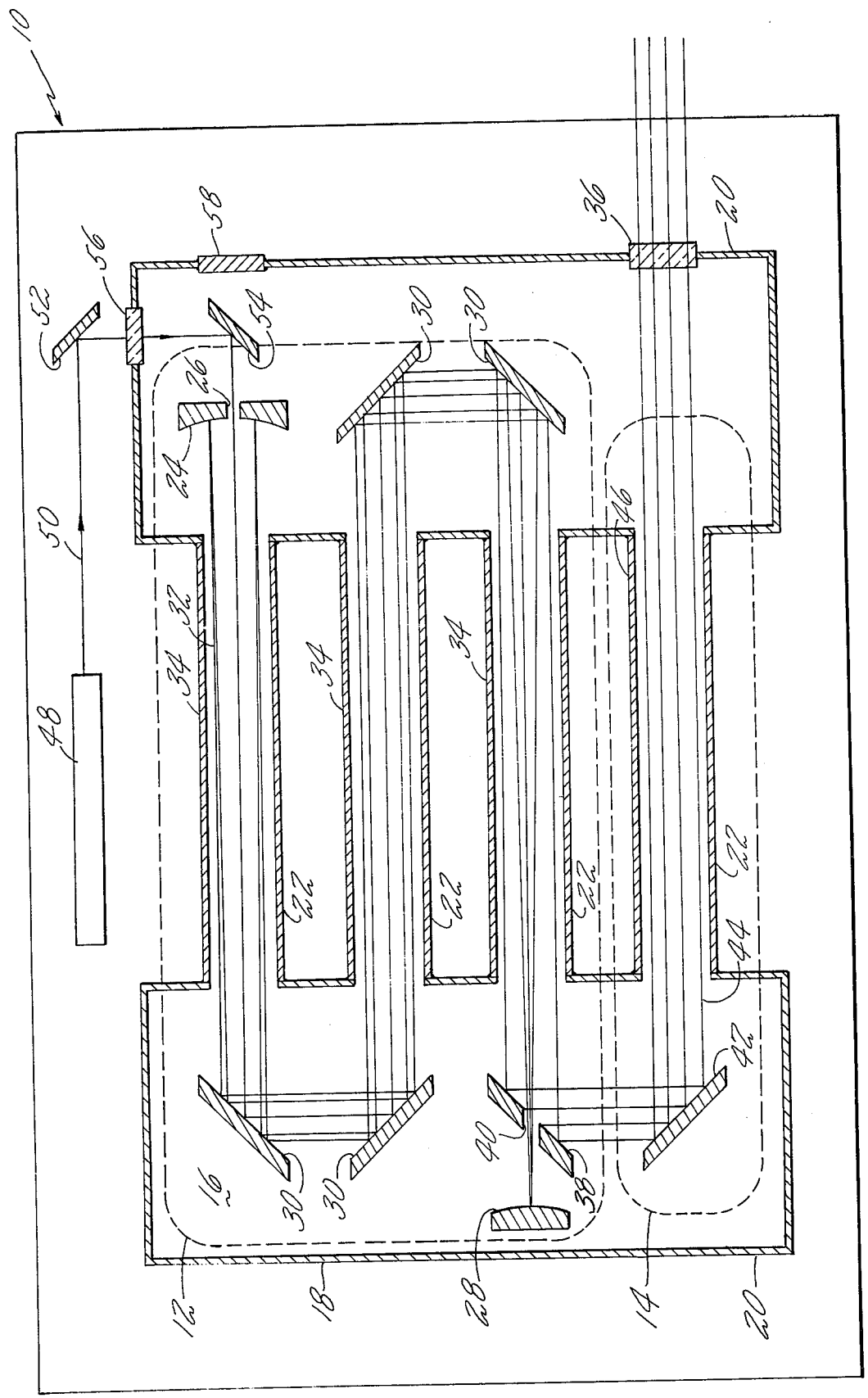

METHOD AND APPARATUS FOR ALIGNING LASER REFLECTIVE SURFACES

BACKGROUND OF THE INVENTION

1. Field of the Invention

The present invention relates to lasers and more specifically to the alignment of laser components utilizing a beam of radiation from an external source.

2. Description of the Prior Art

Aligning the reflective elements of a laser to obtain optimum performance has always required precision adjustment of individual components. Alignment is especially critical in laser resonators where only slight misalignment will cause severe output power reduction.

Lasers having a high output power outside the visible spectrum present added problems because the generated beam is not readily adaptable for use in alignment. One concern is that activation of such a laser for alignment purposes can result in a beam with enough power that the surrounding structure is exposed to damage before the required adjustment is accomplished. Perhaps more important is the danger to personnel in the vicinity during this period. These and other reasons have caused laser operators to use an alignment beam from a low power radiation source to align the reflecting surfaces, particularly in the higher power devices.

Two principal methods have been used to align laser resonators. In a first method one of the end mirrors forming the resonator cavity is removed and a beam of alignment radiation from an external source is injected into the laser cavity. All of the remaining mirrors are oriented with respect to a reference axis established by the alignment beam. The missing end mirror is then replaced and alignment is completed utilizing the laser radiation generated in the cavity. The principal disadvantage of this method is that a complete alignment is not possible before the laser radiation is allowed to oscillate.

A second known method of alignment enables adjustment of the components of an unstable resonator with all reflecting surfaces in place. According to this method an external alignment beam is reflected by an annular coupling mirror into the cavity of an unstable resonator. The principal shortcoming of this method is that the axis of the resonator passes through a center hole in the coupling mirror. Since the alignment beam cannot be reflected by the coupling mirror at the resonator axis, the alignment beam must be directed off center to a reflecting portion of the coupling mirror thereby precluding coincidence of the alignment beam and resonator axis. Additionally, it is difficult to periodically check the system after initial alignment because the source of the alignment beam is in the laser output path and must be removed during laser operation.

Commercial high power lasers require an external alignment beam which can verify system alignment and provide an accurate check on component operation at periodic intervals.

SUMMARY OF THE INVENTION

A primary object of the present invention is to align the mirrors in a laser resonator.

According to the present invention the mirrors of a laser resonator are aligned with a reference beam of coherent radiation from an external source which is directed through an aperture in the center of one of the end mirrors; the reflecting surfaces are aligned by injecting alignment radiation from an external source into the resonator cavity through a first end mirror which has a small aperture, aligning a second end mirror to redirect the alignment beam to the first end mirror with the beam centered about the aperture thereby establishing a resonator axis, and aligning the first end mirror to reflect the redirected alignment beam toward the center of the second end mirror.

One feature of the present invention is the use of visible radiation for an alignment beam which is coincident with the output beam generated by lasing action within the laser cavity. Additional features of the present invention are the aperture in the optical center of one of the end mirrors and the alignment radiation mirror which has a low absorption characteristic for the laser beam. A heat sink provides dissipation of laser energy passing through the alignment radiation mirror.

A principal advantage of the present invention is the precision adjustment made possible by the coincidence of the alignment radiation and the laser beam. Other advantages of the present invention are the abilities to visually align the mirrors and to visually locate the external path of the laser beam. Also, optical components can be inspected for surface imperfections and thermal loading effect with alignment radiation.

The foregoing and other objects, features and advantages of the present invention will become more apparent in the light of the following detailed description of the preferred embodiment thereof as shown in the accompanying drawing.

BRIEF DESCRIPTION OF THE DRAWING

The FIGURE is a simplified plan view of an axial flow unstable resonator including an alignment system in accordance with the present invention.

DESCRIPTION OF THE PREFERRED EMBODIMENT

The main optical components of a typical gas laser 10 which maintains parallel gas flow paths through a plurality of axial flow tubes is shown in the FIGURE. The laser includes an unstable resonator region 12 and an amplifier region 14. A laser medium 16 is contained within a gas envelope 18 comprising a pair of end tanks 20 with interconnecting channels 22. The resonator is formed between a concave mirror 24 having a central aperture 26 and a convex mirror 28. The resonator region contains folding mirrors 30 which direct a beam of laser radiation 32 through the laser medium contained in resonator tubes 34.

The amplifier is located between a laser window 36 mounted integrally with the gas envelope and an annular coupling mirror 38 which has a central hole 40. An amplifier turning mirror 42 directs a coupled beam 44 from the coupling mirror through the laser medium contained in an amplifier tube 46.

A source 48 of alignment radiation 50 and a first alignment mirror 52 are located outside the gas envelope and a second alignment mirror 54 is located inside the gas envelope. An alignment radiation window 56 is mounted integrally with the gas envelope and between the first and second alignment mirrors. A heat sink 58 is located behind the central aperture in the concave mirror.

In a typical alignment sequence the folding, the turning, the coupling, the first and second alignment, and the concave mirrors and the radiation source are placed in approximate alignment with the resonator and amplifier tubes. The alignment radiation source is activated to provide an alignment beam and the alignment mirrors are adjusted to direct the beam through the center of the aperture in the concave mirror. The resonator and amplifier tubes in one embodiment have a circular cross section and are concentrically aligned with the beam produced by the alignment radiation source 48. The turning and the coupling mirrors are then adjusted to centrally position the beam with respect to each mirror. The convex mirror is mounted within the gas envelope behind the coupling mirror and oriented such that the alignment radiation passing through the central hole in the coupling mirror strikes the center of the convex mirror and is divergently reflected to a central position on the apertured concave mirror. The concave mirror is then adjusted so that the central portion of the alignment radiation reflects to the central portion of the convex mirror whereupon the radiation begins to resonate.

The annular coupling mirror is adjusted to pick off an annular portion of the alignment radiation and reflect it centrally upon the turning mirror; the turning mirror is adjusted to direct the annular beam through the amplifier tube concentric with the tube axis. The accuracy of component alignment can be checked by viewing the alignment radiation pattern projected onto an object placed in the path of alignment radiation exiting the gas envelope through the laser beam window. Where alignment is satisfactory, the radiation pattern will contain annular diffraction lines which are sharply focussed and appear concentric with a dark spot in the center of the pattern. If the diffraction lines are not clearly focussed minor adjustment of the concave mirror will bring the annular lines into focus.

When a laser is operating the generated beam will be coincident with the axis established by the alignment radiation and the source of alignment radiation may be deactivated. Alignment may be checked at periodic intervals or the output beam may be located at any instant simply by reactivating the alignment radiation source. The physical insertion or the removal of mirrors from the optics train is not required to check alignment thereby significantly enhancing the accuracy and convenience of alignment procedures.

In a preferred embodiment any commercially available helium/neon laser capable of emitting radiation with a beam width of approximately one hundred thousandths provides a visible beam which is suitably coherent and collimated. Alternatively, a conventional light source, collimated and made coherent by combinations of lenses and aperture plates, will provide an acceptable beam. The helium/neon laser, however, generally provides a superior beam at lower cost than a conventional light source with associated beam forming optics.

In a preferred embodiment the output beam is generated within a resonator cavity with a working medium of carbon dioxide, helium and nitrogen. A small portion of the output beam escapes the resonator cavity through the aperture in the concave mirror and strikes the second alignment mirror. The second alignment mirror is fabricated from a material such as germanium, gallium arsenide, cadmium telluride or zinc selenide which reflects the helium/neon alignment radiation beam and transmits the output laser beam to a heat sink. The second alignment mirror is also coated with a material which is anti-reflective to the carbon dioxide generated output beam. The coating increases the percentage of the output beam which passes through the mirror from approximately fifty percent to approximately ninety percent, thereby preventing damage to the alignment laser by a reflected output beam. A heat sink behind the second alignment mirror is sometimes required to dissipate radiated energy passing through the second alignment mirror.

The aperture in the concave mirror is of slightly smaller diameter than the alignment beam thereby preventing the less-well collimated portion of the beam from entering the resonator cavity. The aperture is sized as small as possible, consonant with providing an adequate alignment beam, to reduce the energy loss from the resonator cavity through the aperture. The aperture in one embodiment is approximately eighty thousandths of an inch diameter.

The alignment beam striking the convex mirror is reflected in a divergent pattern and directed by the folding mirror back through the resonator tubes to the concave mirror where the beam is collimated and returned to the convex mirror with a larger outer diameter. This process, which exactly duplicates the generation of the output beam, continues until the outer diameter of the beam exceeds the diameter of the hole in the center of the coupling mirror. When this occurs, the outer portion of the beam is then reflected by the coupling mirror to the turning mirror where it is directed through the amplifier tube and out through the laser window. The visible beam permits proper positioning of the workpiece with respect to the laser beam before the laser system is energized.

Because the alignment beam replicates the output beam generated within the cavity by lasing action, the entire system can be visually aligned without energizing the output laser system.

The alignment radiation produced by the helium/neon laser is of shorter wavelength than that produced by a carbon dioxide laser system. In the carbon dioxide laser surface imperfections which affect the output laser are more readily apparent when optical components are subjected to the shorter wavelength alignment radiation. If surface imperfections are contained within any of the mirror reflecting surfaces, the alignment beam output will be observed in the near field as a nonuniformly illuminated pattern.

The use of a visible alignment beam additionally allows the observation of thermal loading effects on the folding, turning and coupling mirrors. Approximately one percent of the radiation striking the mirror surfaces is absorbed by the mirror thereby increasing the mirror temperature. As the mirror surface is heated it will deflect from its flat characteristic. This effect can be observed by injecting the visible alignment beam into the resonator cavity during laser operation. If the thermal effect is occurring, the annulus of the visible alignment beam viewed in the near field pattern will be of variant size to that observed in the original alignment cold condition. The thermal effect may be subsequently decreased adjusting the amount of cooling medium to the cooling requirements of any individually affected mirror.

While it is possible that the system may be aligned with a nonvisible alignment beam, additional sensing apparatus would be required to locate the alignment beam at the mirror surfaces.

Although the invention has been shown and described with respect to preferred embodiments thereof, it should be understood by those skilled in the art that the foregoing and other changes and omissions in the form and detail thereof can be made without departing from the spirit and scope of the present invention.

We claim:

1. Method of aligning with a visible beam the reflective surfaces forming a laser having a resonator region including an optical axis, comprising the steps of:
   providing a beam of alignment radiation from an external source;
   directing the beam along the optical axis of the resonator;
   injecting the beam into the resonator through an aperture in a first end mirror;
   aligning a second end mirror such that the center of the alignment beam reflects to the center of the first end mirror; and
   aligning the first end mirror such that the center of the alignment beam reflects to the center of the second end mirror.

2. The invention according to claim 1 wherein the resonator region includes a plurality of resonator tubes which are circular in cross section and contain a portion of the laser medium including, after the step of injecting the beam into the resonator through an aperture in a first end mirror, the further step of
   positioning one or more resonator tubes concentric with the alignment beam.

3. The invention according to claim 2 wherein the resonator region includes one or more folding mirrors which are optically disposed between the first and second end mirrors including, after the step of injecting the beam into the resonator through an aperture in a first end mirror, the further step of
   adjusting the folding mirrors to centrally position the alignment beam with respect to each folding mirror.

4. The invention according to claim 2 having an amplifier region comprising a plurality of amplifier tubes which are circular in cross section and contain a portion of the laser medium further including the step of
   positioning one or more amplifier tubes concentric with the alignment beam.

5. The invention according to claim 4 wherein the resonator includes one or more folding mirrors which are optically disposed between the first and second end mirrors including, after the step of injecting the beam into the resonator through an aperture in the first end mirror, the further step of
   adjusting the folding mirrors to centrally position the alignment beam with respect to each folding mirror.

6. Method of aligning with a visible beam the reflective surfaces forming a laser having an unstable resonator region including an optical axis, comprising the steps of:
   providing a beam of alignment radiation from an external source;
   directing the beam along the optical axis of the resonator;
   injecting the beam into the resonator through an aperture in a first end mirror;
   aligning a second end mirror such that the center of the alignment beam reflects to the center of the first end mirror; and
   aligning the first end mirror such that the center of the alignment beam reflects to the center of the second end mirror.

7. The invention according to claim 6 wherein the resonator region includes a plurality of resonator tubes which are circular in cross section and contain a portion of the laser medium including, after the step of injecting the beam into the resonator through an aperture in a first end mirror, the further step of
   positioning one or more resonator tubes concentric with the alignment beam.

8. The invention according to claim 7 wherein the resonator region includes one or more folding mirrors which are optically disposed between the first and second end mirrors including, after the step of injecting the beam into the resonator through an aperture in a first end mirror, the further step of
   adjusting the folding mirrors to centrally position the alignment beam with respect to each folding mirror.

9. The invention according to claim 7 having an amplifier region comprising a plurality of amplifier tubes which are circular in cross section and contain a portion of the laser medium further including the step of
   positioning one or more amplifier tubes concentric with the alignment beam.

10. The invention according to claim 9 wherein the resonator includes one or more folding mirrors which are optically disposed between the first and second end mirrors including, after the step of injecting the beam into the resonator through an aperture in the first end mirror, the further step of
    adjusting the folding mirrors to centrally position the alignment beam with respect to each folding mirror.

11. The invention according to claim 7 wherein a coupling mirror is located within the resonator region including, after the step of injecting the beam into the resonator through an aperture in a first end mirror, the further step of
    adjusting the coupling mirror so that the alignment beam is centrally positioned with respect to the coupling mirror.

12. The invention according to claim 11 wherein the resonator region includes one or more folding mirrors which are optically disposed between the first and second end mirrors including, after the step of injecting the beam into the resonator through an aperture in a first end mirror, the further step of
    adjusting the folding mirrors to centrally position the alignment beam with respect to each folding mirror.

13. The invention according to claim 11 having an amplifier region comprising a plurality of amplifier tubes which are circular in cross section and contain a portion of the laser medium further including the step of
    positioning one or more amplifier tubes concentric with the alignment beam.

14. The invention according to claim 13 wherein the resonator includes one or more folding mirrors which are optically disposed between the first and second end mirrors including, after the step of injecting the beam into the resonator through an aperture in the first end mirror, the further step of adjusting the folding mirrors to centrally position the alignment beam with respect to each folding mirror.

15. In an unstable laser resonator of the type having a concave end mirror, apparatus for aligning the reflective surfaces of the resonator, wherein the improvement comprises:
   means for providing a coherent and collimated beam of visible alignment radiation;
   an alignment mirror which is external to the resonator for directing the beam along the axis of the resonator; and
   an aperture in the concave end mirror on the axis of the resonator through which the alignment beam enters the resonator.

16. The invention according to claim 15 including a heat sink located behind the apertured end mirror for dissipating laser radiation escaping the resonator through the aperture.

17. The invention according to claim 15 wherein the alignment mirror is fabricated from a material which reflects the alignment beam but which passes a laser beam generated within the resonator.

* * * * *